June 11, 1940.  R. N. BURCKHALTER  2,203,668
OIL FILTER
Filed Nov. 14, 1936   2 Sheets-Sheet 1

Inventor:
Robert Nash Burckhalter
By Gillson, Mann & Cox,
Attys.

Patented June 11, 1940

2,203,668

UNITED STATES PATENT OFFICE 2,203,668

OIL FILTER

Robert Nash Burckhalter, Michigan City, Ind., assignor to Michiana Products Corporation, Michigan City, Ind., a corporation of Indiana Application November 14, 1936, Serial No. 110,846

9 Claims. (Cl. 210—131)

Figure 1:
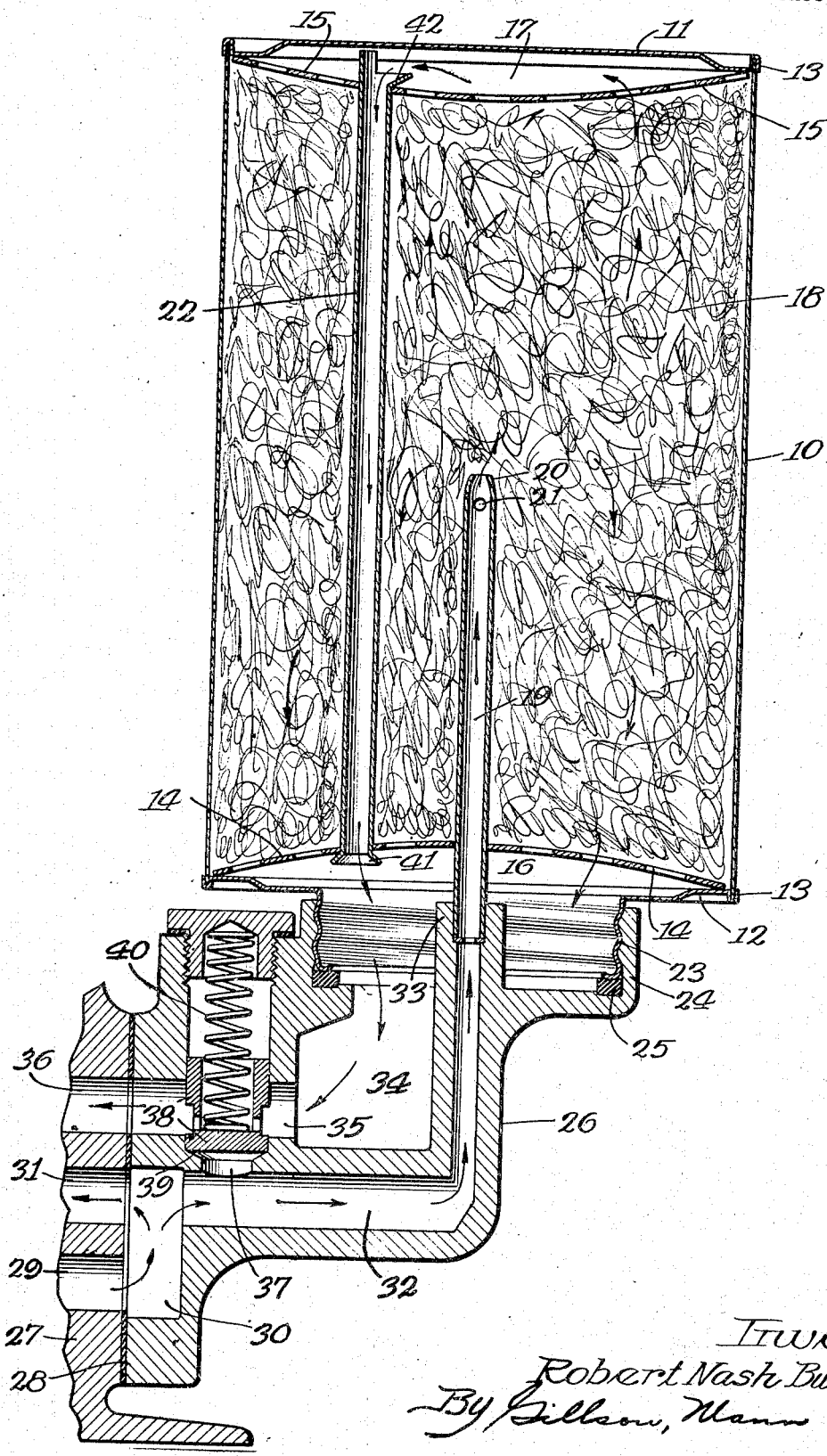
Figure 2:
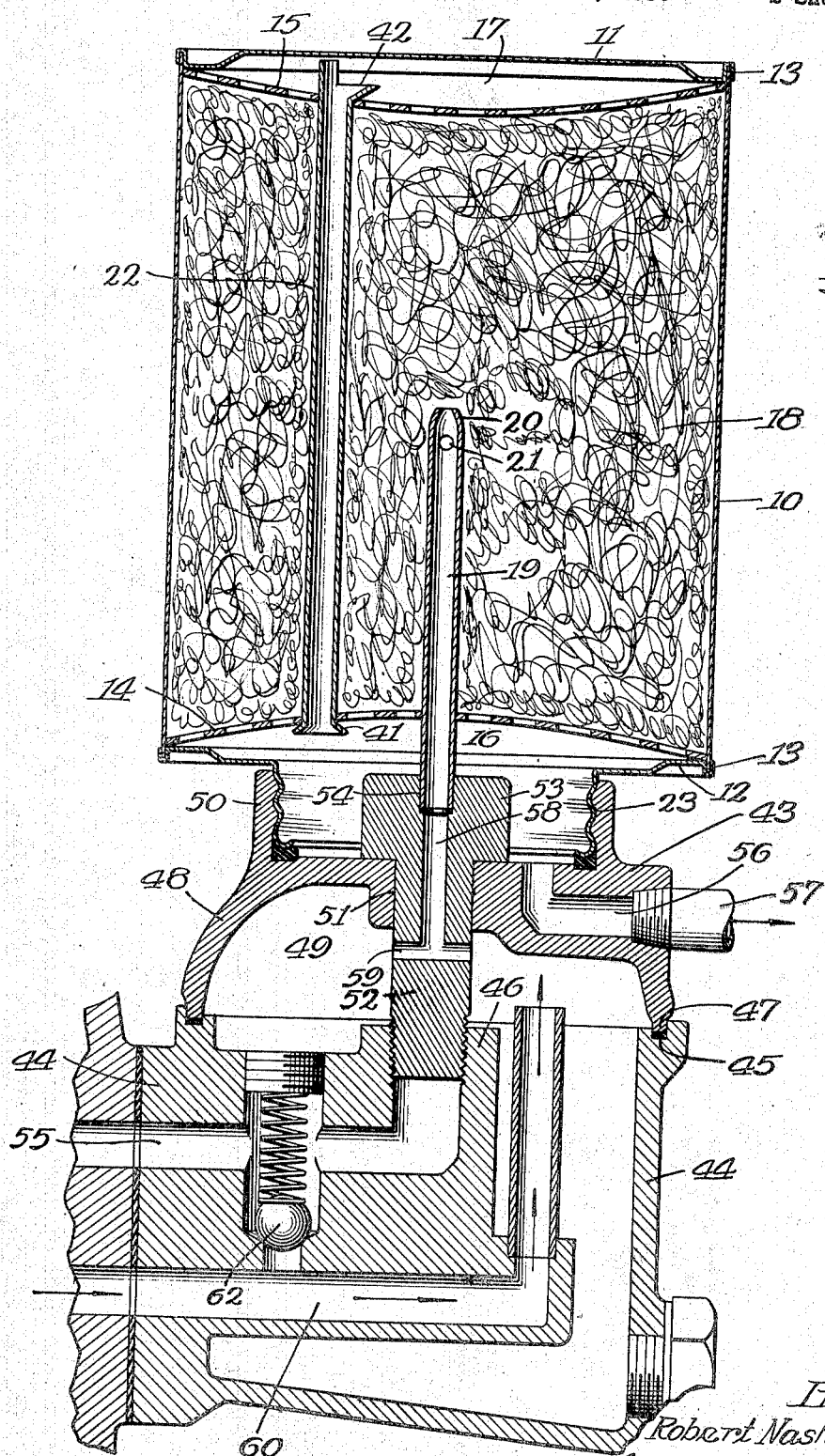

The principal object of this invention is to provide a simple and cheap filter construction of high capacity that is easy to install and replace. Further objects and advantages of the invention will appear as the disclosure proceeds and the description is read in connection with the accompanying drawings, in which Fig. 1 is a vertical section through the preferred embodiment of the invention, mounted on a base fixed to an engine casting, and Fig. 2 is a vertical section of the same embodiment mounted on an adapter, and replacing filter elements of an earlier construction.

However, it is contemplated that the invention will be embodied in other forms and put to other uses within the scope of the claims.

The filter casing shown includes a cylindrical barrel 10 of sheet metal having upper and lower heads 11 and 12, crimped about the ends of the barrel, as indicated at 13, and soldered, welded, or otherwise made fast.

Just inside the heads 11 and 12 are perforated heads 14 and 15 concavo-convex in shape and of a diameter approximately equal to the inside diameter of the barrel 10. These heads cooperate with the heads 11 and 12 to form small chambers 16 and 17. Between the heads 14 and 15 is a mass 18 of fibrous filtering material composed of shredded cotton, wool, a mixture of wool and cotton, or cattle hair and cotton, or cattle hair and asbestos fiber, or cotton and mineral wool, or various other fibrous materials that will be selected according to the particular filtration to be done. For engine oil used in internal combustion engines shredded cotton is preferable, as a rule. The density will be about right for such lubricating oil when the perforated heads exert enough pressure on the filtering material to develop a small amount of resiliency.

As shown, the oil enters the filtering material through a tube 19, which extends through the perforated head 14 axially along the barrel to a point substantially half way between the ends of the mass of filtering material where it terminates in a slightly reduced end 20 adjacent to which there are perforations 21. The oil flows out from the tube radially and divides itself into two streams, one moving downwardly and the other moving upwardly, as indicated by the arrows. From this it will be apparent that the mass of filtering material offers a very great area to the oil to be filtered and, therefore, allows for easy flow while furnishing capacity for a great volume of oil.

After passing through approximately one-half of the mass of filtering material, the filtered oil reaches one of the chambers 16 or 17. Those chambers are connected by a tube 22, here shown as extending entirely through the mass of filtering material 18, and through the heads 14 and 15. Oil that has reached the chamber 17 passes down through the tube 22 and joins the other oil in the chamber 16.

Filters of this general character embodying the invention may be mounted in a great variety of ways. As shown in Fig. 1, the head 12 is provided with a threaded neck 23, received in a corresponding threaded socket 24 against a suitable gasket 25. The socket 24 is formed as part of a base casting 26, secured to the engine casting 27 with a gasket 28 imposed between to make an oil-tight joint. The engine casing has a passage 29 leading from the familiar oil pump to a cored passage 30 in the base 26, which communicates with a passage 31 in the engine casing leading to the bearings and also a passage 32 leading through the base to a nipple 33, into which the lower end of the tube 19 is tightly fitted and made fast.

The base 26 has a chamber 34 in open communication with the neck 23 and also a passage 35 leading to a passage 36 in the engine casing by which the oil is returned to the crank case. The passage 35 is connected with the passage 32 by a short by-pass 37 guarded by a valve 38 urged to its seat 39 by a spring 40.

In a normal operation of the device shown in Fig. 1, oil from the pump reaching the cored passage 30 divides into two streams, one going to the left through 31 to the bearings, and the other going to the right through 32, into the tube 19, thence into the intermediate portion of the filtering material, where it divides into two streams, one going to the chamber 16 and the other going to the chamber 17 through approximately half of the filtering mass. The oil from the chamber 17 passes down through the tube 22 to the chamber 16 and there the combined streams pass out through the passage 35 to the crank case.

Should the pressure in the line to the bearings exceed the selected limit, the by-pass or limiting valve 38 will open and permit a portion of the oil to return to the crank case through the passage 36.

The filter can be made in a great many forms, and the form shown can be assembled in a variety of ways. As shown, the tube 22 has a spun head 41 at the lower end before assembly and after reaching the position shown, the upper end is struck with a suitable tool to set over approximately one-half, as shown at 42.

It is preferable to pack the filtering material in the barrel before the tubes 19 and 22 are inserted. Their entry into the fibrous mass will be made very easy by using as a pilot an air jet of slightly larger diameter than the tubes 19 and 22. The operation of forming the holes for the tubes can be separate, in which case suitable pins will be inserted immediately to hold the fibrous material displaced, and prevent the openings being closed up before the tubes can be entered.

Fig. 2 shows this preferred embodiment of the filter equipped with an adapter 43, by which the filter is readily mounted in a base 44 of a type heretofore in common use with engine filters made by the Michiana Products Corporation; see Burckhalter et al., No. 2,031,589, Feb. 25, 1936.

One characteristic of the base 44 is a groove 45 concentric with a threaded nipple 46, the latter being in communication with the outlet 55 to the bearings.

The adapter has a cylindrical flange 47 corresponding to the groove 45 and above that a curved wall 48 forming a sort of chamber 49. On the upper side the adapter has a threaded socket 50 for cooperation with the threaded neck 23 of the filter proper.

In order to fasten the adapter 43 to the base 44, it is provided with a central opening 51, to receive a hollow bolt 52 threaded into the socket 46, and forcing the flange 47 against a gasket in the groove 45. The head 53, of the bolt 52, has a socket 54 into which the tube 19 is fitted tightly and made fast. The socket 54 is really a center bore communicating with a central passage 58 leading to a cross bore 59, establishing communication with the chamber 49.

The adapter in this instance is provided with an outlet port 56 for connection with the oil piping 57, leading to the bearings or to the crank case; and upon placing the adapter on the base 44 it can be turned to locate the port 56 in any direction suited to the conditions before the bolt 52 is screwed down.

The base 44 is provided with an inlet 60 for oil from the pump and that inlet communicates with the chamber 49 in the adapter. The oil from the chamber 49 runs through the cross bore 59 into the central passage 58, thence through the tube 19 and the filter, as before described, back to the neck 23, which is in communication with the outlet 56, leading to the piping 57.

Should the filter clog due to cold or dirt, the by-pass valve 62 will open and let oil go directly from the inlet passage 60 to the outlet passage 55 leading to the bearings.

This is just one form of adapter suited to one set of connections for an earlier type of filter. Those skilled in the art will readily make other forms suited to other conditions.

I claim as my invention:

1. A filter comprising, in combination, a base having a threaded socket and having intake and outlet ports, a filter member comprising a sheet metal barrel having sheet metal end walls, one of said end walls having an integral externally threaded open neck portion for engaging said socket and communicating with said outlet port, perforated false heads adjacent to the ends of the barrel, a mass of fibrous filtering material substantially filling the space between the heads, a tube communicating with said intake port and extending through said neck portion into and terminating in the central portion of the mass and in contact therewith for conducting oil into and discharging the same into the central portion of said mass and another tube extending through the mass and the heads and spaced laterally from the first-named tube and having its ends open and spaced inwardly from the end walls of said barrel and wholly contained within said barrel and in communication with said neck portion and said outlet port, said first-named tube being permanently connected to said base and extending axially into said mass whereby said barrel may be readily removed by unscrewing said neck portion from said socket and lifting the barrel from said first-named tube.

2. A filter comprising a sheet metal barrel closed at one end and having at its other end a sheet metal end wall provided with an open integral attaching portion, perforated false heads, one adjacent to each end of the barrel, a mass of fibrous filtering material filling the space between the heads, said mass of filtering material having an elongated opening extending upwardly from its lower portion and terminating approximately at its central portion for receiving a tube, said tube being adapted to extend through the opening in the attaching portion and into and terminating in the central portion of the mass and in contact therewith for delivering unfiltered oil into the central portion of the mass, and another tube extending through the mass and the heads for conducting filtered oil through said mass, said last named tube being contained within said barrel and having its ends open and spaced inwardly from the end walls of said barrel and in communication with the attaching portion whereby filtered oil above the upper false head may flow downwardly through said last named tube through said mass and into the attaching portion.

3. A filter comprising, in combination, a base having intake and discharge ports, a sheet metal barrel having a closed end and having an open end mounted on said base, a tube rigidly connected to the intake port and extending upwardly therefrom through said open end, a recess in said base in communication with said discharge port, perforated false heads within said barrel adjacent to the ends thereof, a mass of fibrous filtering material substantially filling the space between said heads, said mass having an axial opening receiving said tube, a second tube laterally of the axis of the barrel extending through said mass and heads and having its ends open and spaced inwardly from the ends of the barrel for conducting filtered oil from above the upper head through said open end to said recess, said first named tube terminating at substantially the central portion of said mass whereby oil to be filtered will be delivered to the central portion of said mass and a portion thereof will pass upwardly through the upper portion of said mass above the upper head within said barrel and then downwardly through said second named tube to said recess and the remaining oil to be filtered will pass downwardly through said mass and through said open end and into said recess, and means for rigidly securing said barrel to said base whereby said barrel may be removed for replacement by first releasing said means and then lifting the same upward from said first named tube.

4. A filter comprising a sheet metal barrel having a closed upper end and a lower open end, upper and lower perforated false heads within said barrel, each spaced inwardly from the adjacent end, a mass of fibrous filtering material substantially filling the space between said heads, said mass being provided with a preformed axial opening in its lower portion, communicating with the opening in said lower end, and terminating at substantially the central portion of said mass, a tube member of less length than said barrel extending through said mass and heads laterally of said axial opening and having its ends open and distorted beyond said false heads for preventing its removal from said heads, said tube communicating with the opening in said lower end.

5. An adapter for use in attaching a filter member to a base comprising a body portion having an axial opening therethrough for the reception of a connector member, a circular flange extending outwardly from said body portion for engaging in a circular groove in said base and for forming a chamber between said base and adapter, said body portion having a downwardly and outwardly extending passage laterally of said axial opening for discharging filtered oil therethrough, and said body portion being provided with an outwardly extending circular internally threaded flange on the side opposite said circular flange for attaching a filter casing to said connector.

6. A filter comprising a base having a threaded opening surrounded by a circular groove, an adapter having a central opening aligned with the opening in the base and a flange seated in the circular groove and forming with the base an oil chamber, a ported connector element engaged with the threaded opening in the base and making the adapter fast on the base and having its ports in communication with said chamber, a discharge oil passage in said adapter, a filter casing mounted on said adapter in communication with said discharge passage and having a passage in communication with said chamber, and filter material in said casing.

7. A filter comprising in combination a base having an opening surrounded by a circular groove, an adapter having a central opening aligned with the opening in the base and a flange seated in the circular groove, a ported connector element penetrating the opening in the adapter and having one end secured in the base opening and its other end overlying the margins of the opening in the adapter, said connector element making the adapter fast on the base, a filter casing carried by the adapter opposite the flange thereof, and means including a passage through said connector for conducting oil to and from said filter casing.

8. A filter comprising in combination a base having a threaded opening surrounded by a circular groove, an adapter having a central opening aligned with the opening in the base and a flange seated in the circular groove, a ported connector element penetrating the opening in the adapter and having one end threaded in the base opening and its other end overlying the margins of the opening in the adapter, said connector element being adapted to be turned down with the named threaded parts in engagement to compressively seat the adapter flange in the circular groove of the base, a filter casing carried by the adapter opposite the flange thereof, and passages through said base, adapter and connector element for conducting oil to and from said filter casing.

9. A filter comprising in combination a base having an opening, an adapter having an opening aligned with the base opening, complemental flange and groove means carried by the base and adapter and adapted to be engaged together, a ported connector element engaged with the named openings and adjustably secured in one of them to make the adapter fast on the base, a filter casing carried by the adapter opposite said flange and groove means, means including a passage through said connector for conducting contaminated oil to said filter, and a passage in said adapter for conducting filtered oil from said filter casing.

ROBERT NASH BURCKHALTER.